March 21, 1961     V. G. REILING     2,976,093
FABRICATION OF PLASTIC MATERIAL
Filed March 28, 1958     2 Sheets-Sheet 1
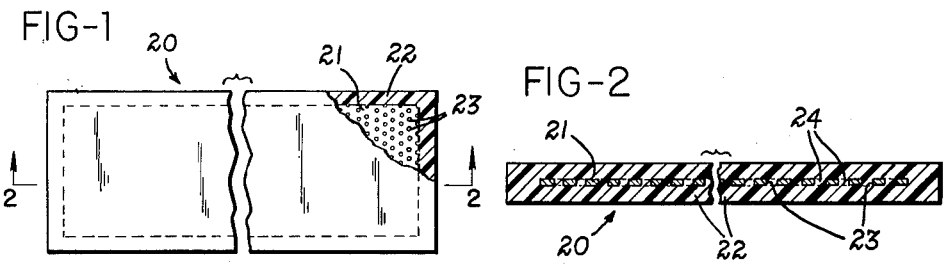
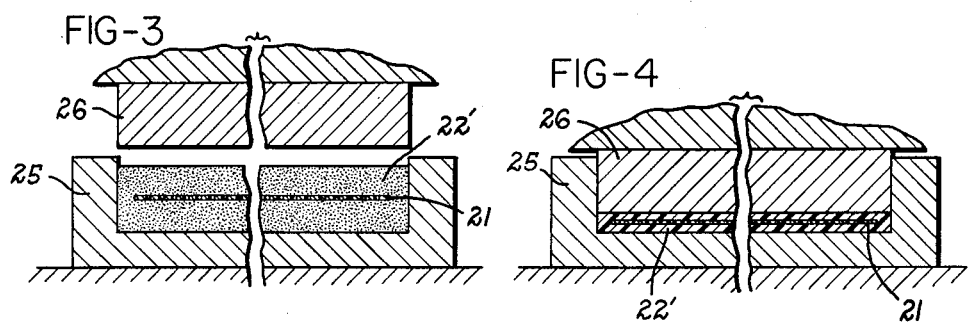
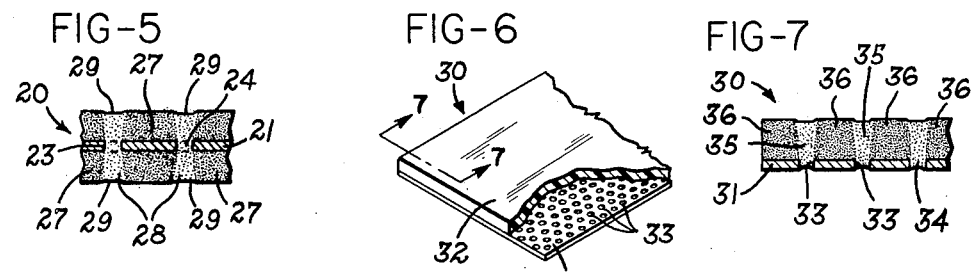
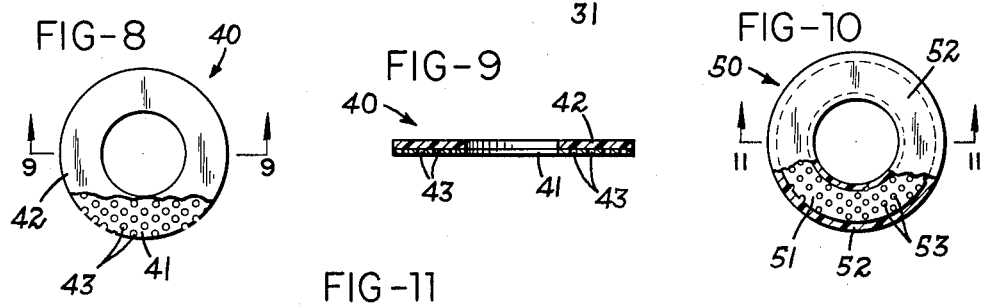
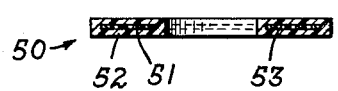
INVENTOR.
VICTOR G. REILING
BY Marshall, Biebel, French & Bugg
ATTORNEYS March 21, 1961 V. G. REILING 2,976,093
FABRICATION OF PLASTIC MATERIAL
Filed March 28, 1958 2 Sheets-Sheet 2
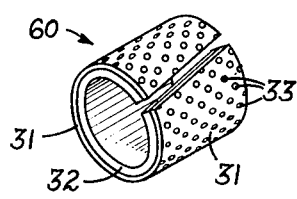
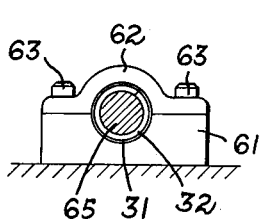
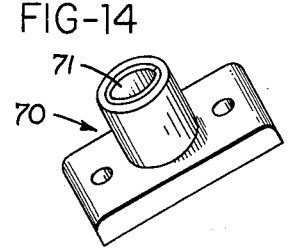
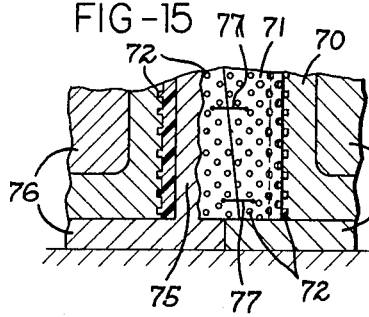
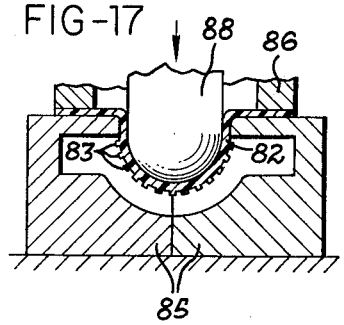
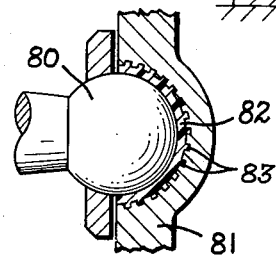
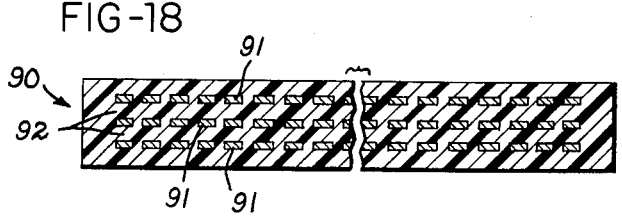
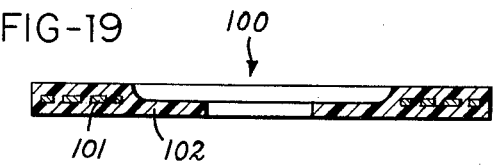
INVENTOR.
VICTOR G. REILING
BY
Marechal, Biebel, French & Bugg
ATTORNEYS United States Patent Office 2,976,093
Patented Mar. 21, 1961

2,976,093

FABRICATION OF PLASTIC MATERIAL

Victor G. Reiling, Dayton, Ohio, assignor, by mesne assignments, to The Durion Company, Inc., Dayton, Ohio, a corporation of New York Filed Mar. 28, 1958, Ser. No. 724,686

14 Claims. (Cl. 308—238)

This invention relates to the fabrication of structural members of sintered plastic material.

The invention relates particularly to articles fabricated from fluorocarbon polymers, such as the tetrafluoroethylene resins sold under the trade name Teflon, which are available commercially in powdered form and which are fabricated by preforming under pressure to compact the powder to the desired shape followed by sintering or baking under relatively high temperature, and the invention is also applicable to these materials which have been mixed or "filled" with other materials such as glass fibers, carbon, metallic powders, and pigments. These sintered plastics have excellent bearing properties even in the absence of a lubricant, and they have the additional advantage of being highly inert and are therefore useful for sealing purposes, particularly where corrosive materials are involved. However, they also have a definite tendency to cold flow under load, especially at elevated temperatures, and the resulting changes in shape and dimensions affect their utility in structural members.

It is a primary object of the present invention to provide a structural member which includes a load-supporting surface formed by a layer of sintered plastic of such internal structural characteristics as to include within its integral body a plurality of portions of substantial volume which are of appreciably less density than the major portion of the layer and into which the material of the more dense portions of the layer are able to move under pressure without substantially affecting the overall dimensions of the layer.

This primary object of the invention has been successfully accomplished by the combination of a sintered plastic material of the type outlined above with a rigid reinforcing member having multiple perforations therethrough on which the plastic layer is preformed and sintered under such conditions that portions of the plastic layer project in interfitting relation within the perforations and thereby establish greater thickness in the portions of the plastic layer aligned with these perforations than in the portions thereof directly overlying the reinforcing member. Since these thicker portions of the plastic layer are subjected to the same unit pressure as the other portions of the plastic during preforming, they are compacted to a lesser degree and are therefore less dense and have a higher void content than the other portions. In addition, they effectively interlock with the reinforcing member after sintering to retain the interfaces of the two layers in intimate contact irrespective of the presence or absence of adhesive forces between the plastic layer and the reinforcing member.

It is therefore an object of this invention to provide a reinforced article of sintered plastic wherein a layer of the plastic material forms an exposed load-supporting surface, a reinforcing member is intimately interconnected with the overlying plastic layer by means of integral portions of the plastic layer which interfit with perforations in the reinforcing member, and wherein the interfitting portions of the plastic layer are of less density than its remaining portions and are therefore capable of receiving the material from the more dense portions of the plastic layer which cold flows in response to application of pressure on the load-supporting surface.

An additional object of the invention is to provide a reinforced plastic article as outlined above wherein there are layers of sintered plastic material on both sides of the reinforcing member which are interconnected by integral portions projecting through multiple perforations in the reinforcing member, and a further object of the invention is to provide such a reinforced article wherein the plastic material completely encloses the edges of the reinforcing member to protect the latter against corrosive or abrasive forces in use.

Another object of the invention is to provide a method of fabricating a reinforced sintered plastic article as outlined above wherein the powdered plastic is preformed by compaction under pressure in contact with a perforated reinforcing member under uniform pressure conditions causing the powdered plastic to be compacted to a greater extent in the portions thereof directly overlying the reinforcing member than in the portions projecting within the perforations in the reinforcing member, and wherein the plastic material is then sintered under conditions retaining the differential compaction characteristics of the preformed plastic layer and therefore establishing a lower density in the less highly compacted portions of the plastic material than in the portions thereof directly overlying the reinforcing member.

It is also an object of this invention to produce a bearing member wherein the load-supporting bearing surface is composed of a layer of sintered plastic material which includes multiple integral portions projecting from the back surface thereof and which is incorporated in a supporting body of metal or other cast material wherein the projections on the back surface of the plastic layer are embedded to serve as anchors for the plastic layer in the supporting body.

Still another object of the invention is to provide a method of producing a bearing member as outlined in the preceding paragraph wherein the plastic layer is preformed and sintered to the desired configuration, including the multiple projecting portions on the back surface thereof, and wherein the supporting body is then cast in supporting relation with the plastic layer to embed the projections on the back of the plastic layer in the material of the supporting body as it sets to hardened condition.

A still further object of the invention is to provide a bearing member as outlined above wherein the projecting portions of the plastic layer and the material of the plastic layer directly overlying these projecting portions are of appreciably lesser density than the other portions of the plastic layer and are therefore able to receive the material from the other portions of the plastic layer which may cold flow under load supporting stresses, and it is also an object of the invention to provide such a bearing member wherein the less dense portions of the plastic layer serve as reservoirs retaining a supply of lubricant for release therefrom under working pressures onto the load-supporting surface of the bearing.

Additional objects and advantages of the invention will be apparent from the following description, the accompanying drawings and the appended claims.

In the drawing—

Fig. 1 is an elevational view, partly broken away, showing an article produced in accordance with the invention and comprising a metal reinforcing member entirely enclosed within a body of sintered plastic material;

Fig. 2 is an enlarged section on the line 2—2 of Fig. 1;

Figs. 3 and 4 are somewhat diagrammatic views illustrating successive steps in the fabrication of the article of Figs. 1 and 2;

Fig. 5 is a greatly enlarged fragment of Fig. 2 illustrating diagrammatically the internal structure thereof;

Fig. 6 is a fragmentary perspective view, partly broken away, showing another article fabricated in accordance with the invention and comprising a layer of sintered plastic material on a metal backing;

Fig. 7 is a fragmentary section similar to Fig. 5 and taken as indicated by the line 7—7 of Fig. 6;

Fig. 8 is a plan view, partly broken away, showing a thrust washer constructed similarly to the article of Fig. 6;

Fig. 9 is an enlarged section on the line 9—9 of Fig. 8;

Fig. 10 is a view similar to Fig. 8 showing a pressure sealing gasket fabricated in accordance with the invention;

Fig. 11 is an enlarged section on the line 11—11 of Fig. 10;

Fig. 12 illustrates one form of cylindrical bearing member fabricated in accordance with the invention;

Fig. 13 illustrates the bearing member of Fig. 12 in a mounting;

Fig. 14 is a perspective view showing another form of bearing member fabricated in accordance with the invention;

Fig. 15 is an enlarged fragmentary section illustrating the method of producing the bearing member of Fig. 14;

Fig. 16 is a sectional view showing a ball joint produced in accordance with the invention;

Fig. 17 is a somewhat diagrammatic view illustrating a step in the fabrication of the ball joint of Fig. 16;

Fig. 18 is a fragmentary view similar to Fig. 2 showing an article embodying the invention and including multiple reinforcing members therein; and Fig. 19 is a sectional view showing a sealing ring of non-uniform cross-section produced in accordance with the invention.

Referring to the drawing, which illustrates preferred embodiments of the invention, the article 20 shown in Figs. 1 and 2 is suitable for uses where the rigidity of metal and the low frictional qualities of Teflon materials are desired, for example in a vane-like scraper for use in mixing apparatus or a load-supporting vane in a pump. The article 20 comprises a metal reinforcing member 21 which is wholly enclosed within a body 22 of sintered plastic material, and the member 21 has multiple perforations 23 therein through which integral portions 24 of the plastic body 22 project as shown in Figs. 2 and 5.

Figs. 3 and 4 illustrate a method of fabricating the article of Figs. 1 and 2 in conjunction with a mold 25 and a pressure plunger 26. The first step in this method is to place a layer of the powdered plastic material in the bottom of the mold to the desired depth, as indicated at 22', and then after the reinforcing member 21 is laid in place, additional powder is poured thereon to the desired total depth locating the member 21 approximately centrally in the powder as shown. The plunger 26 is then actuated to preform the powder 22' by compaction within the mold 25, and during this step as shown in Fig. 4, the thickness of the composite materials may be reduced by as much as 4–6 to 1. The resulting preformed composite article is then subjected to the proper elevated temperature, in excess of the gel point of the material, to effect sintering of the compacted powder, an appropriate temperature being in excess of 620° F. in the case of the Teflon materials noted above.

Fig. 5 best illustrates certain characteristics of the resulting product which are significant in accordance with this invention. In the first place, it will be noted that the thickness of the composite material 21—22' of Fig. 3 is uniformly reduced during the compaction step shown in Fig. 4. However, there is a greater thickness of powder in each area overlying one of the perforations 23 than in the areas overlying the imperforate portions of the member 21, and a characteristic of these materials is substantial resistance to lateral displacement in powder form. The result of these facts is that during the preforming step, the powder 22' is more highly compacted in the portions of the layer overlying the imperforate portions of the member 21 than in the portions overlying the perforations 23. This differential compaction represents a variation in the density or void contact between the several portions of the article which is maintained and to some extent enhanced throughout the sintering step, and this is represented in Fig. 5 by the more heavily stippled portions 27 in comparison with the lightly stippled portions 28 of the plastic material 22 which overlie and include the projections 24 within the several perforations 23.

As stated, the finished article following sintering comprises multiple portions 27 of maximum density interspersed with multiple portions 28 of minimum density, and these relative density properties are further demonstrated by the fact that as the article cools following sintering, its outer surfaces tend to contract slightly towards the perforations 23 to leave what may be described as multiple small dimples 29 overlying the portions 28 as shown in Fig. 5. The resulting composite structure has a number of important practical advantages. For example, the portions 24 of the plastic which project through the perforations 23 form integral connections between the plastic material overlying one surface of the member 21 and the plastic material on the other surface of the reinforcing member, and thus they bind the whole together even though the Teflon material normally has no appreciable adhesion for metal. This result is further aided by the portion of the plastic layer 22 which surrounds the edges of the member 21 to enclose the latter completely within the plastic, and this arrangement also assures that if the article is used for purposes such as scraping, there will be a working edge portion of the Teflon material available wherever desired for engagement with the surface to be scraped. At the same time, the member 21 reinforces the composite structure to provide the strength and rigidity which the plastic material alone may not possess to an adequate degree.

A particularly important property of the composite article resulting from its internal structure discussed above is related to the ability or tendency of the Teflon materials to deform by cold flow under pressure. It will be apparent that if an article of the structure shown in Figs. 1 and 5 is subjected to pressure normal to its major surfaces, the pressure load will be effective first on the more dense portions 27. If this pressure is sufficient to initiate cold flow, the less dense portions 28 provide spaces into which the cold flow can take place without appreciable overall change in the dimensions of the article. In other words, instead of conditions causing all cold flow deformation to take place outwardly, as would be the case if the article were of uniform density, the structure produced in accordance with the invention makes it possible for a very considerable amount of what may be considered as internal cold flow which will not appreciably affect the overall dimensions of the article.

A further advantage deriving from the characteristic just discussed is that the multiple internally connecting portions 24 contribute an additional controlling action against permanent deformation under pressure, both because they are able to absorb material from the more dense portions as it cold flows and also because they thus distribute cold flow deformation throughout the entire body in such manner that there is comparatively little cold flow at any one point and therefore it is correspondingly easier for the article to return to its normal condition and shape after the pressure conditions are relieved.

It should now be apparent that the characteristics and advantages produced in accordance with the invention depend upon the use of plastic materials capable of fabrication by performing in powder form followed by a sintering operation to develop the desired permanent strength characteristics in the preformed article. More particularly, the invention depends for its novel results upon the conditions of differential compaction produced by preforming in combination with a perforate reinforcing member which give rise to the differential density properties in the finished article as described above, and such properties are not obtainable with plastic materials which are normally molded from a hot melt or otherwise fused form, since the latter technique promotes uniform density characteristics in the molded article. It is for this reason that this disclosure and the appended claims stress the application of the invention to preformed and sintered plastic materials, with the preferred example as stated being fluorocarbon polymers typified by tetrafluoroethylene resins, and it is also to be understood that this terminology includes other halogen-substituted olefin polymers of comparable properties.

The invention is not limited to the fabrication of articles wherein the reinforcing member is entirely enclosed within the plastic material. Thus Figs. 6 and 7 show a part of an article 30 which might serve, for example, as a slideway on a machine tool and which comprises a perforated metal backing strip 31 having a layer 32 of sintered plastic material preformed and sintered thereon to include integral portions 34 projecting through the perforations 33 in the member 31. The article 30 may be formed in the same way as described in connection with Figs. 3 and 4 except that the reinforcing member 31 is initially laid in the bottom of the mold with no plastic powder beneath it. The member 31 is then covered with an adequate layer of plastic powder which is compacted in the mold as shown in Fig. 4 and subsequently sintered, and the result will be to produce areas of differential density as shown in Fig. 7 which include low density portions 35 overlying and including the projections 34 and portions of high density 36 overlying the imperforate portions of the metal member 31.

It is of particular interest in accordance with the invention that the article 30 is physically and mechanically stable in spite of the fact that there is no appreciable adhesion between the plastic material and the metal backing. Apparently this is due to the fact that the plastic material tends to shrink with respect to the member 31 as it cools following sintering, due to the very substantial difference in coefficient of thermal expansion between the plastic and the metal. However, since the plastic material is relatively hard and inflexible, particularly in the small dimensioned projections 34, and since the shrinkage is primarily parallel to the face of the member 31, the projections 34 are prevented from withdrawing from the perforations 33 and are thereby caused to anchor the plastic layer in place through the friction which each projection 34 develops with respect to its own perforation 33.

A product of the characteristics shown in Figs. 6 and 7 has highly desirable properties as a load-supporting member such as a thrust bearing, slideway or the like. The naturally low frictional characteristics of the fluorocarbon polymers are enhanced by the ability of the plastic layer to cold flow without appreciable deformation by reason of the low and high density portions as described. Furthermore, if additional lubricating action is desired, the low density portions 35 have the further desirable property of providing absorptive capacity for lubricant from which the lubricant may be extruded under load if desired to lubricate the surface of the plastic layer, and this is especially the case when the absorptivity of the plastic is enhanced by including therein a filler material such as glass fibers or the like.

Figs. 8 and 9 represent a specific form of the general structure shown in Figs. 6 and 7 to provide a thrust bearing washer 40. The metal backing ring 41 for the sintered plastic layer 42 includes multiple perforation 43 through which the plastic material projects in the same manner as already described in connection with Fig. 7. The part 40 can be fabricated initially as already described in connection with Figs. 1–6, or it could be formed by a simple blanking operation from a larger sheet of the characteristics shown in Fig. 6, and it possesses all of the properties described in connection with Figs. 6 and 7.

Figs. 10 and 11 show the application of the invention to a pressure washer 50 adapted for use where a seal may be needed against the escape of fluids. The metal reinforcing ring 51 is entirely enclosed within a sintered plastic body 52, and the perforations 53 in the ring 51 receive integral projecting portions of the plastic material as already described in connection with Figs. 2 and 5. The part 50 may be produced in accordance with the invention in the same manner as described in connection with Figs. 3 and 4, with the central portion of the plastic being subsequently punched out to the desired inner diameter.

Figs. 12 and 13 illustrate the adaptation of the basic structure shown in Fig. 6 to the production of a radial bearing. The split cylinder 60 is produced by rolling a composite strip comprising portions 31 and 32 produced as described in connection with Fig. 6. This cylinder 60 may then be mounted in any suitable mounting such as the pillow block shown in Fig. 13 and comprising a base 61, a cap 62, and connecting bolts 63, and Fig. 13 also shows the bearing supporting a shaft 65. The perforated backing strip 31 cooperates with the projecting portions of the plastic layer which extend within the perforations 33 to anchor the plastic layer in place, and also these projecting portions may serve as reservoirs for a liquid lubricant if desired as already described.

Figs. 14 and 15 illustrate the application of the invention to the production of a radial bearing unit 70 having a liner 71 of sintered plastic material. In the production of this bearing unit, the plastic layer 71 is first preformed and sintered in the manner described in connection with Figs. 6 and 7, but thereafter it is stripped from its backing piece, which may be effected by peeling away from the metal in such manner as to pull the projections 72 successively from the perforations in the metal piece. The plastic layer is then wrapped around a suitable mandrel to provide a cylinder of the desired inner diameter for incorporation in a supporting body. Thus Fig. 15 shows a mandrel 75 forming a part of a mold 76 adapted to be filled with a fused casting material such as a die casting metal or a plastic such as epoxy resin, and it will be apparent that materials capable of injection molding in fused condition are usable as casting materials in this form of the invention. The abutting or overlapping ends of the plastic piece 71 may be held together during this step in any suitable way such as by one or more staples as indicated at 77 in Fig. 15.

When the casting material has set in the above step to form the body of the bearing, it is found that although there may be no direct adhesion between this material and the back of the liner 71, nevertheless the multiple projections 72 are in effect integrally anchored in the cast body in such manner as to secure the liner firmly in place. In addition, since the liner 71 possesses the same properties of differential density produced as described in connection with Figs. 6 and 7, its inner surface can deform by cold flow under load without appreciably affecting its overall dimensions. Furthermore, if it is desired to enhance the anti-frictional properties of the plastic material by means of an additional lubricant, the low density portions of the liner will serve as a convenient reservoir therefor as already described.

Fig. 16 illustrates a further form of bearing produced in accordance with the invention and comprising a ball socket joint for the ball-ended rod 80 in the member 81 which may, for example, be a wabble plate or the like. The ball socket joint comprises a spherically curved layer 82 of a sintered plastic which is anchored within a complementary recess in the part 81 by means of the multiple projections 83 on the back surface thereof. The retainer 84 may be of any conventional type.

Fig. 17 illustrates a method in accordance with the invention for producing the ball socket joint of Fig. 16. The layer 82 is initially fabricated as described in connection with Fig. 6 and is then stripped from the perforated metal backing member to leave the integral projections 83 on its back surface. The layer 82 is superimposed on a mold 85 of desired configuration, and its outer periphery is clamped to the mold as indicated at 86. The layer 82 is then formed inwardly of the mold 85 to the desired configuration of its front surface, as represented in Fig. 17 in conjunction with a forming mandrel or plunger 88, with this forming operation taking place at a suitably elevated temperature for ready deformation of the plastic material.

The layer 82 is held in the deformed position shown in Fig. 17 while the interior of the mold 85 is filled with molten metal or other casting material. If the inner front surface of the layer 82 has not already conformed closely to the forming surface of the mandrel 88, the pressure of the casting material on its back surface will produce this result, and the casting material is caused to set while the plastic layer 82 is held in its deformed shape. When the mold is then disassembled and the excess material of layer 82 trimmed away, it will be found that the projections 83 are anchored in the cast material and cooperate therewith to hold the layer 82 firmly in place. It will also be apparent that the resulting structure possesses the same advantages deriving from the differential density properties of the plastic material which have already been described.

One of the features of the molding techniques described in connection with Figs. 14–17 is that it is possible to employ metal as the casting material which fuses at a substantially higher temperature than the degradation temperature of the Teflon material without undesirable affecting the latter in the finished product. This result may be partially explained by the fact that the metal is maintained at its fusing temperature for only a very short interval after introduction into the mold before the temperature drops to arrange substantially below the degradation temperature of the plastic material. Additionally, if some slight degradation should take place in the surface areas exposed to the molten metal, the Teflon materials are themselves such poor conductors of heat that the front surface of the plastic layer remains entirely unaffected. Whatever be the explanation, the fact remains that the products produced as described in connection with Figs. 14–17 show no indication of damage from contact with the molten casting metals and do possess the desirable properties imparted thereto by the differential density characteristics developed during initial fabrication of the plastic layer.

The above molding technique is of particular significance in connection with an article of the type shown in Fig. 16 wherein the plastic layer is deformed from its natural flat shape, since with the materials used in the practice of the invention, this creates stresses in the direction tending to flatten the layer such that it would ultimately flatten as the result of plastic memory, particularly at elevated temperatures. When the composite structure is produced as described in connection with Fig. 17, however, and even though there is no appreciable adhesion between the plastic and metal surfaces, nevertheless there appears to be established an anchoring of the projections 83 in the metal body of sufficient force to hold the plastic layer to its preformed shape and to overcome the flattening stresses.

Preferred results are obtained in the practice of the invention if the thickness of the final sintered plastic layer on either side of the reinforcing member is not too great, for example not greater than about ⅛ inch. However, if the final part is to be of such dimensions that this dimension would be substantially exceeded if only one reinforcing member were used, the advantages of the invention can be obtained by the use of two or more reinforcing members arranged in alternating relation with layers of the resin material. Fig. 18 shows a fragment of such a composite article 90 in which a plurality of perforated metal sheets 91 alternate with the sintered plastic material 92, and an article of this type can be produced in essentially the same manner as already described in connection with Figs. 3–4. The article is first built up from alternating layers of powdered resin and the reinforcing members, and after preforming and sintering, it will have properties comparable to those illustrated in Fig. 5.

It should also be understood that the invention is not limited to the production of articles of essentially uniform thickness. Thus Fig. 19 shows a sealing ring 100 having a stiff outer portion of substantially greater thickness than its inner portion. A perforate metal ring 101 similar to the ring 41 is located in the sintered plastic material 102 forming the outer portion of the ring 100 which is adapted to be clamped in position surrounding a shaft while the thin unreinforced inner portion of the ring 100 can be deflected into sealing relation with the shaft itself. Such articles of non-uniform shape are readily produced in a mold of suitable construction in essentially the same manner as described in connection with Figs. 3–4.

While the methods and articles herein described constitute preferred embodiments of the invention, it is to be understood that the invention is not limited to these precise methods and articles, and that changes may be made therein without departing from the scope of the invention which is defined in the appended claims.

What is claimed is:

1. An article of manufacture comprising a rigid backing member having multiple holes therein, a body of sintered plastic material overlying said backing member and including an integral portion projecting within each said hole in said backing member, said plastic body being of greater density in the portions thereof directly overlying said backing member than in the portions thereof overlying and projecting within said holes to provide for cold flow of said material under pressure from said more dense portions into said less dense portions substantially without change in the thickness of said article, and said projecting portions of said plastic body cooperating with the adjacent edge portions of said holes to secure said body in maintained intimate contact with said backing member.

2. An article of manufacture comprising a sheet of sintered plastic material, a multiplicity of spaced integral portions projecting from one surface of said sheet, said sheet being of greater density in the portions thereof located between said projections than in the portions thereof forming said projections, and said projections and the portions of said sheet overlying said projections having substantially the same density.

3. An article of manufacture comprising a rigid backing sheet having multiple perforations therethrough, a layer of sintered plastic material overlying each surface of said backing member, integral portions of said plastic material projecting through said perforations in said backing sheet, said plastic material being of greater density in the portions thereof directly overlying said backing sheet than in the portions thereof overlying and projecting through said perforations to provide for cold flow of said material under pressure from said more dense portions into said less dense portions substantially without change in the thickness of said article, and said projecting portions of said plastic material being integrally connected with both of said layers to secure said layers in maintained intimate contact with said backing sheet.

4. An article of manufacture comprising a continuous body of sintered plastic material, a rigid backing member wholly enclosed within said plastic body and having multiple perforations therethrough, said plastic body including an integral portion projecting through each said perforation in said backing member in integrally connected relation with portions of said plastic material on either surface of said backing member, said article being of substantially uniform thickness over the entire area thereof, and said plastic material being of greater density in the portions thereof overlying said backing member than in the portions thereof overlying and projecting through said perforations to provide for cold flow of said material under pressure from said more dense portions into said less dense portions substantially without change in the thickness of said article.

5. An article of manufacture comprising a rigid backing member having multiple perforations therethrough, a layer of sintered plastic material overlying only one surface of said backing member, said plastic layer also including an integral portion projecting through each said perforation in said backing member substantially to the plane of the other surface thereof, said plastic layer being of greater density in the portions thereof directly overlying said backing member than in the portions thereof overlying and projecting through said perforations to provide for cold flow of said material under pressure from said more dense portions into said less dense portions substantially without change in the thickness of said article, and said projecting portions of said plastic layer cooperating with said perforations in said backing member to secure said plastic layer in maintained intimate contact with said backing member.

6. An article of manufacture comprising a rigid backing member of annular shape having multiple perforations therethrough, a body of sintered plastic material enclosing said backing member and including marginal portions overlapping both the inner and outer peripheral edges of said backing member, said plastic body also including an integral portion projecting through each said perforation in said backing member in integrally connected relation with portions of said plastic material on either surface of said backing member, said plastic material being of greater density in the portions thereof directly overlying said backing member than in the portions thereof overlying and projecting through each said perforation to provide for cold flow of said material under pressure from said more dense portions into said less dense portions substantially without change in the thickness of said article, and said marginal and projecting portions of said plastic layer cooperating with the adjacent edge portions of said backing member to secure said plastic body in maintained intimate contact with said backing member.

7. A bearing construction of the character described comprising a supporting body of cast material, a lining within said body consisting of a layer of sintered plastic material including a plurality of integral projections extending in spaced relation from the radially outer surface thereof, said projections interfitting with said cast material of said body to effect anchoring of said layer to said body, and said plastic layer being of greater density in the portions thereof intermediate said projections than in the portions thereof overlying and including said projections to provide for cold flow of said material under pressure from said more dense portions into said less dense portions substantially without change in the thickness of said layer.

8. A bearing construction of the character described comprising a supporting body of cast material, a lining within said body consisting of a layer of sintered plastic material formed to a curved configuration of the front surface thereof creating stresses therewithin in the direction to flatten said layer, said layer including a plurality of integral projections extending in spaced relation from the radially outer surface thereof, said projections interfitting with the cast material of said body to effect anchoring of said layer to said body and thereby to resist said flattening stresses, and said plastic layer being of greater density in the portions thereof intermediate said projections than in the portions thereof overlying and including said projections to provide for cold flow of said material under pressure from said more dense portions into said less dense portions substantially without change in the thickness of said layer.

9. The method of fabricating an article of a sinterable plastic material which includes the steps of applying said plastic material in powder form to a rigid backing member having multiple perforations therein until a layer of said powder of substantial thickness is established on the surface of said backing member and said perforations are filled with said powder, applying a compacting force on the exposed surface of said powder layer under controlled pressure causing uniform reduction of the combined thickness of said powder and backing member and thereby compacting said powder overlying and within said perforations to a lesser density than said powder overlying the portions of said backing member intermediate said perforations, and subjecting said compacted powder and said backing member to an elevated temperature effecting sintering of said powder while maintaining the relative density conditions established throughout said sintered material by said compacting step.

10. The method of fabricating an article of a sinterable plastic material which includes the steps of forming a layer of said plastic material in powder form, superimposing a rigid backing member having multiple perforations therein on said layer, applying additional said powder on said backing member until a further layer thereon of substantial thickness is established on the exposed surface of said backing member and said perforations are filled with said powder, applying a compacting force on the exposed surface of said powder under controlled pressure causing uniform reduction of the combined thickness of said powder and backing member and thereby compacting said powder overlying and within said perforations to a lesser density than said powder overlying the portions of said backing member intermediate said perforations, and subjecting said compacted powder and said backing member to an elevated temperature effecting sintering of said powder while maintaining the relative density conditions established throughout said sintered material by said compacting step.

11. The method of fabricating an article of a sinterable plastic material which includes the steps of placing on a rigid supporting surface a rigid backing member having multiple perforations therethrough, applying said plastic material in powder form to said backing member until a layer of said powder of substantial thickness is established on the surface of said backing member and said perforations are filled with said powder, applying a compacting force on the exposed surface of said powder under controlled pressure causing uniform reduction of the combined thickness of said powder and backing member and thereby compacting said powder overlying and within said perforations to a lesser density than said powder overlying the portions of said backing member intermediate said perforations, and subjecting said compacted powder and said backing member to an elevated temperature effecting sintering of said powder while maintaining the relative density conditions established throughout said sintered material by said compacting step.

12. The method of fabricating a sintered plastic article having a multiplicity of integral portions projecting from at least one surface thereof which includes the steps of placing on a rigid supporting surface a rigid backing member having multiple perforations therethrough, applying said plastic material in powder form to said backing member until a layer of said powder of substantial thickness is established on the surface of said backing member and said perforations are filled with said powder, applying a compacting force on the exposed surface of said powder under controlled pressure causing uniform reduction of the combined thickness of said powder and backing member and thereby compacting said powder overlying and within said perforations to a lesser density than said powder overlying the portions of said backing member intermediate said perforations, subjecting said compacted powder and said backing member to an elevated temperature effecting sintering of said powder while maintaining the relative density conditions established throughout said sintered material by said compacted step, and separating said sintered plastic member from said rigid backing member.

13. The method of fabricating an article of a sinterable plastic material which includes the steps of placing on a rigid supporting surface a rigid backing member having multiple perforations therethrough, applying said plastic material in powder form to said backing member until a layer of said powder of substantial thickness is established on the surface of said backing member and said perforations are filled with said powder, applying a compacting force on the exposed surface of said powder under controlled pressure causing uniform reduction of the combined thickness of said powder and backing member and thereby compacting said powder overlying and within said perforations to a lesser density than said powder overlying the portions of said backing member intermediate said perforations, subjecting said compacted powder and said backing member to an elevated temperature effecting sintering of said powder while maintaining the relative density conditions established throughout said sintered material by said compacting step, stripping said sintered layer from said backing member by withdrawing said portions thereof from said perforations to provide a corresponding multiplicity of integral projections on the back surface of said layer, then forming said sintered layer to a predetermined configuration of the front surface thereof while maintaining said projections on said back surface, applying a fused casting material to said back surface of said formed sintered layer, and causing said fused material to set while holding said layer in said formed configuration to effect anchoring of said projections in the resulting set cast material.

14. The method of fabricating a bearing of the character described which includes the steps of preparing a layer of sintered plastic material having a substantially smooth front surface and provided on the back surface thereof with multiple integral projections, forming said plastic layer to a predetermined configuration of said front surface thereof while maintaining said projections on said back surface, applying a fused casting material to said back surface of said formed plastic layer, and causing said fused material to set while holding said layer in said formed configuration to effect anchoring of said projections in the resulting set cast material.

References Cited in the file of this patent

UNITED STATES PATENTS

| | | |
|---|---|---|
| 1,160,364 | Baekeland | Nov. 16, 1915 |
| 1,494,099 | Cole | May 13, 1924 |
| 2,400,091 | Alfthan | May 14, 1946 |
| 2,400,099 | Brubaker | May 14, 1946 |
| 2,456,262 | Fields | Dec. 14, 1948 |
| 2,460,361 | Petho | Feb. 1, 1949 |
| 2,622,949 | Cotchett | Dec. 23, 1952 |
| 2,695,425 | Stott | Nov. 30, 1954 |
| 2,702,730 | Ivanoff | Feb. 22, 1955 |
| 2,728,619 | Haller | Dec. 27, 1955 |
| 2,786,792 | Mikiska | Mar. 26, 1957 |
| 2,815,253 | Spriggs | Dec. 3, 1957 |

OTHER REFERENCES

"Sintered Nylon Plastics," by Harms, Product Engineering Magazine, November 1954, pages 150–153.

UNITED STATES PATENT OFFICE
CERTIFICATE OF CORRECTION

Patent No. 2,976,093                                               March 21, 1961

Victor G. Reiling

It is hereby certified that error appears in the above numbered patent requiring correction and that the said Letters Patent should read as corrected below.

In the grant, lines 2 and 12, and in the heading to the printed specification, line 4, name of assignee, for "The Durion Company, Inc.", each occurrence, read -- The Duriron Company, Inc. --.

Signed and sealed this 17th day of October 1961.

(SEAL)
Attest:

ERNEST W. SWIDER                                             DAVID L. LADD
Attesting Officer                                            Commissioner of Patents

USCOMM-DC